US008892386B2

(12) United States Patent
Adir et al.

(10) Patent No.: US 8,892,386 B2
(45) Date of Patent: Nov. 18, 2014

(54) METHOD AND APPARATUS FOR POST-SILICON TESTING

(75) Inventors: Allon Adir, Kiryat Tivon (IL); Eyal Bin, Haifa (IL); Shady Copty, Nazareth (IL); Anatoly Koyfman, Kiriat Yam (IL); Shimon Landa, Kiryat (IL); Amir Nahir, Kfar Vitkin (IL); Vitali Sokhin, Haifa (IL); Elena Tsanko, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 13/179,526

(22) Filed: Jul. 10, 2011

(65) Prior Publication Data
US 2013/0013246 A1  Jan. 10, 2013

(51) Int. Cl.
G06F 19/00 (2011.01)
G06F 11/263 (2006.01)

(52) U.S. Cl.
CPC .................. G06F 11/263 (2013.01)
USPC ............................ 702/117; 714/33

(58) Field of Classification Search
USPC ........................................ 702/117
See application file for complete search history.

(56) References Cited

U.S. PATENT DOCUMENTS

| 5,930,291 | A | * | 7/1999 | Hines ............................ 375/133 |
| 6,285,974 | B1 | * | 9/2001 | Mandyam et al. .............. 703/13 |
| 7,392,171 | B2 | | 6/2008 | Blasi et al. |
| 7,496,464 | B2 | * | 2/2009 | Huang et al. .................. 702/117 |
| 2003/0126515 | A1 | * | 7/2003 | Abdo .............................. 714/43 |
| 2004/0168106 | A1 | * | 8/2004 | Cherny et al. .................. 714/32 |
| 2004/0216061 | A1 | * | 10/2004 | Floyd et al. ...................... 716/4 |
| 2004/0225973 | A1 | * | 11/2004 | Johnson ........................... 716/4 |
| 2006/0112257 | A1 | * | 5/2006 | Undy et al. ....................... 712/1 |
| 2006/0155525 | A1 | * | 7/2006 | Aguilar et al. .................. 703/26 |
| 2007/0021989 | A1 | * | 1/2007 | de Marcken ...................... 705/5 |
| 2009/0083699 | A1 | * | 3/2009 | Santhanam .................. 717/107 |
| 2009/0222694 | A1 | | 9/2009 | Adir et al. |

OTHER PUBLICATIONS

A. Adir et al "Genesys-ro: Innovations in test generation for functional processor verificaiton", IEEE Design & Test of Computers, V 21, n 2, Mar.-Apr. 2004,84-93.*
A. Adir et al "Genesys-Pro: Innovations in test generation for functional processor verificaiton", IEEE Design & Test of Computers, V 21, n 2, Mar.-Apr. 2004,84-93.*

* cited by examiner

*Primary Examiner* — Sujoy Kundu
*Assistant Examiner* — Corey Bailey
(74) *Attorney, Agent, or Firm* — Ziv Glazberg

(57) ABSTRACT

An apparatus and a computer-implemented method performed by a computerized device, comprising: generating a collection of test data for testing one or more domains, wherein the test data is useful for post-silicon verification of hardware devices; selecting a subset of the collection of test data in accordance with a hardware device to be tested and at least one of the domains to be tested with respect to the hardware device; and indexing the subset of the collection of test data to obtain an indexed collection.

18 Claims, 2 Drawing Sheets

METHOD AND APPARATUS FOR POST-SILICON TESTING

TECHNICAL FIELD

The present disclosure relates to hardware testing in general, and to post-silicon testing, in particular.

BACKGROUND

Computerized devices control almost every aspect of our life—from writing documents to controlling traffic lights. However, computerized devices are bug-prone, and thus require a testing phase in which the bugs should be discovered. The testing phase is considered one of the most difficult tasks in designing a computerized device. The cost of not discovering a bug may be enormous, as the consequences of the bug may be disastrous. For example, a bug may cause the injury of a person relying on the designated behavior of the computerized device. Additionally, a bug in hardware or firmware of a marketed product may be expensive to fix, as patching it requires call-back of the computerized device. Hence, many developers of computerized devices invest a substantial portion of the development cycle to discover erroneous behaviors of the computerized device.

The target computerized system may be a processor, a microprocessor, an electronic circuit, an integrated circuit, a chipset, a computerized device comprising a processor or the like. Testing such devices may comprise one or more pre-silicon stages and/or one or more post-silicon stages.

During the pre-silicon stages, devices are generally tested in a computerized environment simulating the functionality of the devices, such as using HDL simulator, emulators, hardware accelerators, and formal verification tools. In pre-silicon stages, the target computerized system may be described using a descriptive language, such as for example Verilog or VHDL.

Post-silicon validation and debug is the last step in the verification of a computerized device. Post-silicon validation tests occur on the actual devices running at-speed in commercial, real-world system boards, using logic analyzer and assertion-based tools.

In the present disclosure, fabricated target computerized system may be referred to as a circuit, silicon, processor, hardware device or simply device.

The post-silicon stage may refer to a stage once the target computerized system has been fabricated. For example, the post-silicon stage may be after the target computerized system is produced in accordance with a description provided in a descriptive language. It will be noted that the circuit may be different than a finalized product, such as for example comprising only a chip without a casing, being assembled manually, being only partially assembled, a manufactured wafer, or the like.

Modern chips may comprise hundreds of thousands of logic elements and a large number of functionalities and features. It is therefore highly time consuming to thoroughly test the chip, i.e., verify all its areas operate in accordance with the design. On the other hand, due to business-related reasons, it is of high importance that the chip is released on time without undue delays. The time window that is thus available for testing is bounded by receiving the device from the semiconductor fabrication plant (FAB) on the one hand, and the expected release date on the other hand.

It is therefore important to utilize this time window as intensively as possible, and perform the post-silicon validation with enhanced efficiency.

Exercisers are common tools for post-silicon testing. An exerciser is an application that is being loaded to the tested system, generates test cases, executes them, and checks their behavior or results. However, exercisers should be kept as simple as possible due to a number of reasons, including for example the need to debug the target platform, enabling high utilization of the testing platform, or the like.

Since hardware failures are extremely hard to debug, simple software is normally used in order to ease the effort. A complex exerciser may add a redundant level of complexity to the debug process.

An exerciser typically starts executing at an early stage of the bring-up of the device, when no operating system thus no sophisticated debug tools are available, and every operation is performed directly by the device with no abstraction level provided by the operating system.

The exerciser is executed by the device that it tests. Therefore, if the device has a bug, then the bug may be exhibited by the operation of the exerciser itself. It is thus preferable to use an exerciser that performs simple operations for its own functionality and utilizes the device extensively when test cases are executed.

In addition, in order to test some areas of a device, for example floating point operations, it may be required to generate a large amount of test data, including test data that is known to be complex.

However, generating such data is time consuming, which leads to poor utilization of the testing time window, since the tested device is idle while waiting for tests to be generated. Also, if the device is idle for significant part of the time, some errors or problems that occur only after continuous long period of operation of the device may not occur, thus providing non-representative test results. Moreover, generating the data may require complex computations by the exerciser.

BRIEF SUMMARY

One exemplary embodiment of the disclosed subject matter is a computer-implemented method performed by a computerized device, comprising: generating a collection of test data for testing one or more domains, wherein the test data is useful for post-silicon verification of hardware devices; selecting a subset of the collection of test data in accordance with a hardware device to be tested and at least one of the domains to be tested with respect to the hardware device; and indexing the subset of the collection of test data to obtain an indexed collection.

Another exemplary embodiment of the disclosed subject matter is an apparatus having a processing unit and a storage device, the apparatus comprising: a collection of test data for testing one or more domains associated with a hardware device to be tested, wherein the test data is useful for post-silicon verification of the hardware device, and wherein the collection stored on the storage device; a test data selection component for selecting a subset of the collection of test data in accordance with the hardware device to be tested and at least one of the domains to be tested; and a test data indexing component for indexing the subset of the collection of test data to obtain an indexed collection.

Yet another exemplary embodiment of the disclosed subject matter is a computer program product comprising: a non-transitory computer readable medium; a first program instruction for generating a collection of test data for testing one or more domains, wherein the test data is useful for post-silicon verification of hardware devices; a second program instruction for selecting a subset of the collection of test data in accordance with a hardware device to be tested and at least one of the domains to be tested with respect to the hardware device; and a third program instruction indexing the subset of the collection of test data to obtain an indexed collection, wherein said first, second and third program instructions are stored on said non-transitory computer readable medium.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
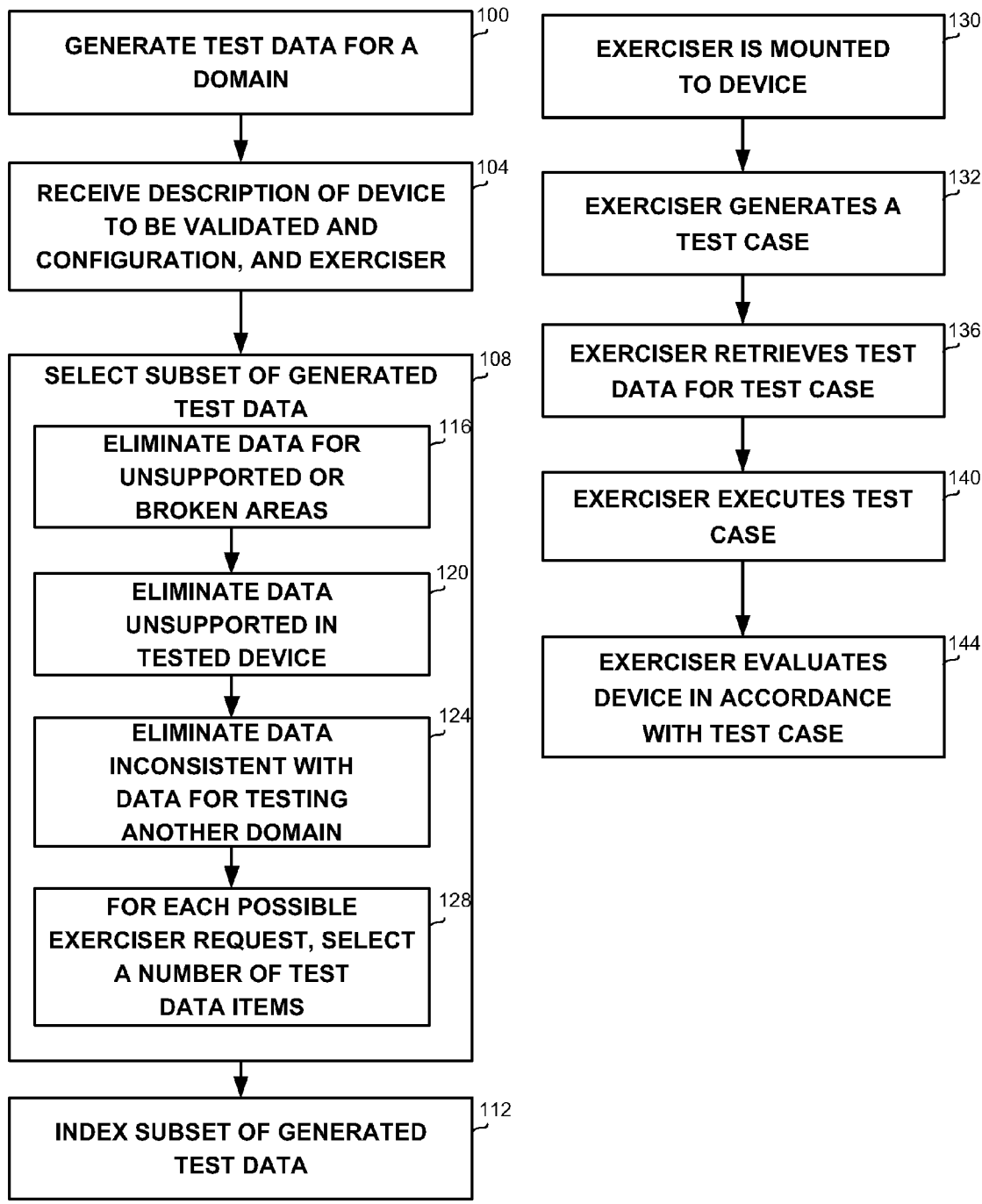
FIG. 1A shows a flowchart diagram of steps in a method for generating test data for post-silicon device testing, in accordance with some exemplary embodiments of the disclosed subject matter.
FIG. 1B shows a flowchart diagram of steps in a method for post-silicon device testing, in accordance with some exemplary embodiments of the disclosed subject matter.

The disclosed subject matter is described below with reference to flowchart illustrations and/or block diagrams of methods, apparatus (systems) and computer program products according to embodiments of the subject matter. It will be understood that blocks of the flowchart illustrations and/or block diagrams, and combinations of blocks in the flowchart illustrations and/or block diagrams, can be implemented by computer program instructions. These computer program instructions may be provided to one or more processors of a general purpose computer, special purpose computer, a tested processor, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transient computer-readable medium that can direct a computer or other programmable data processing apparatus to function in a particular manner, such that the instructions stored in the non-transient computer-readable medium produce an article of manufacture including instruction means which implement the function/act specified in the flowchart and/or block diagram block or blocks.

The computer program instructions may also be loaded onto a device. A computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to test a device in a post silicon stage, where testing is to be done on the device itself rather than using simulations or emulations. The device may be a prototype, a wafer, a fabricated circuit, an integrated circuit, or the like.

In typical environments, the time window available for such testing is generally highly constrained and should be well utilized so that the device will function a significant part of the testing, and perform as many tests as possible including non-trivial tests or other tests known to challenge specific features, thus improving coverage. This will also account for detecting problems that may occur only after the device has been continuously operating for at least a predetermined period of time.

On the other hand, in order to cover all complex parts of the design, it is required to produce tests with a variety of test data, and in particular complex or problematic test data. However, producing such data is time consuming and may thus collide with the testing time criteria discussed above.

Another technical problem is that the device may have a limited associated memory, which is typical when a test-template is executed from on-chip cache having for example volume of 32 MB, 64 MB, or the like. Testing the device in post-silicon may be limited to utilizing the associated memory and should be adapted to the limited memory space.

In some methods, in order to save the generation time, a fixed set of tests may be prepared on the pre-silicon stage and run during testing. However, this methodology suffers from a long overhead because of the bring-up time required for reloading the system for each new test as well as downloading test results for checking.

One technical solution comprises preparing, prior to the post-silicon stage, a large collection of test data for each domain that may be tested, such as floating point operations, address translation, memory allocation and in particular between different threads, pipelining, caching, Input/Output, bus, or any other domain. The test data may comprise ordinary cases of no special significance, as well as cases known to be interesting and challenging, either in general or for a particular device or configuration. The collection should provide all types of data for all types of devices, and may evolve over time.

Once the device to be tested, its configuration, and test template become known, the collection is filtered and one or more relevant subsets of the collection are selected.

The selected data is then arranged for efficient retrieval, for example by indexing, in accordance with a multiplicity of parameters, such as tested domain, tested functionality, or the like.

The selected and indexed test data can then be loaded together with an exerciser that tests the device to a memory unit associated with the device. The selected subset is thus limited in size so as to fit, together with the exerciser, within the memory unit. The exerciser then causes the device to generate test cases, populate each test case with one or more items of the test data and execute the tests.

One technical effect of utilizing the disclosed subject matter is the combination of offline generation of a large amount of test data which requires intensive time and computation resources, selection of relevant subsets of the test data, and online fast and efficient test generation, wherein the generated tests use the offline-generated test data.

This combination accounts for availability of large amount and relevant high quality test data which enables thorough testing of the device also in extreme scenarios. The combination also enables high utilization of the device during the testing time window since complex data is retrieved rather than generated online.

Another technical effect of the disclosed subject matter relates to the efficient usage of the limited storage resources available during testing, by storing only test data that is relevant to the tested device and tested functionality.

Yet another technical effect is to enable utilization of a relatively simple exerciser, which need not perform the complex computations required to produce test data of high quality, while still utilizing such test data in the testing performed by the exerciser.

Referring now to FIG. 1A, showing a flowchart of steps in a method to be performed by a computerized device, for generating test data for post-silicon device testing.

On test data generation step 100, test data is generated for one or more domains, wherein the test data is useful for post-silicon testing of hardware devices. The domains may include but are not limited to: floating point operations, address translation, memory allocation and in particular memory allocation between different threads, pipelining, caching, Input/Output, bus, or the like. The test data may include random data but may also include data known to indicate problems. For example, in test data for checking floating point division operations, the test data may include numbers whose ratio is very close to 1, or numbers whose ratio is extremely large, which may prove to be problematic in many cases. Similarly, the data may include addresses which could cause issues, such as pairs of memory addresses within the same cache line or congruence class, or within consecutive cache lines, memory addresses that begin in a first page and end in a consecutive page, or the like. The test data can be generated manually, automatically, received from an external source, or any combination thereof.

On step 104 a description of the device to be tested may be received, including for example the device configuration, and a description of one or more exercisers for testing the device. The description can include one or more domains to be tested or one or more functionalities of a domain to be tested.

On selection steps 108, a subset of the test data generated on step 100 may be selected for the particular device and exercisers received on step 104. Exemplary sub-steps of step 108 are further detailed below. In some exemplary embodiments, the subset may be selected to be small enough so as to fit, together with the exerciser, within a memory unit of the tested device.

On indexing step 112 the subset selected on step 108 may be indexed or otherwise arranged for enhancing the retrieval of particular test data. Indexing may relate to the domain being tested and may be hierarchical, for example "Floating point calculations" and further "floating point division" and even further "floating point division with ration close to 1". Indexing may relate to any association of test data with any one or more parameters, such as domain, operation, specifically biased operation, or the like. It will be appreciated by a person skilled in the art that the exemplary indexing above is conceptual only and actual indexing may use any method or system, such as tables, decision trees, or others.

Selection steps 108 may comprise eliminating or filtering out tests that are not required in the particular scenario. It will be appreciated that step 108 may be implemented in a variety of embodiments, and the presented embodiment is exemplary only.

It will be further appreciated that the implementation of each of the sub-steps detailed below depends on the particular domain to be tested. The current disclosure exemplifies the implementation of each sub-step for three domains, being floating point, address translation and memory allocation.

In the exemplary embodiment, selection steps 108 comprise substep 116 for eliminating data which relates to unsupported broken, or otherwise non-functional design areas. Thus, if some areas of the design are known not to work, to not work well enough, or to contain bugs, such as floating point division operations, data related to these areas will be eliminated.

In the floating point domain, areas that might require elimination include denormal numbers which are numbers that fill the underflow gap around zero in floating point arithmetic, micro-coded instructions such as division and square root, and exceptions. Since the above operations are indicated as floating-point biased, their elimination is straight-forward and requires a single pass through the data.

In the address translation domain, typical areas that may require elimination are unsupported page sizes and unsupported translation paths. Since the above areas are generation criteria upon which test data may have been generated, their elimination is straight-forward and requires a single pass through the data.

In the memory allocation domain, a typical area that may require elimination relates to unsupported page sizes or page types, such as pages that may or may not require caching. Since page size is a generation criteria upon which test data may have been generated, the elimination is straight-forward and may be performed using a single pass through the data.

In the exemplary embodiment, selection steps 108 further comprise substep 120 for eliminating data which is not supported for the given machine state, including the machine configuration.

In the floating point domain, certain data cannot be used by all machine configurations, and this information may be reflected in the data indexing. Thus the irrelevant items may be removed as described above. For example, if floating point instructions are disabled, no data is required and all floating point-related data can be eliminated. In another example, if floating point interrupts are disabled, data that causes exceptions may be eliminated.

In some embodiments, certain floating point instructions may have different implementations for different configurations, in which case only the data relevant for a given configuration is to be used.

For example, in processor configurations, wherein there may only be one active thread per core, some of the pre-generated data such as data that causes the file pointer pipeline to flush may have little or no value, since this data may be used for interfering with execution of floating point instructions on a different thread, since the threads share a pipeline.

Some floating point instructions may also be removed from the collection at a later stage.

In the address translation domain, the relevant machine configuration part is the supported address space. The addresses, including the effective, real and other addresses, are part of the data item description, thus the undesired data items can be removed similarly to step 116 above.

In the memory allocation domain, the relevant machine configuration part is the supported address space. The real addresses are part of the data item description, and the undesired data items can be removed similarly to step 116 above.

Selection steps 108 may further comprise substep 124 for eliminating data inconsistent with test data related to other domains, i.e., data that relates to cases that cannot be solved by the two domains. When there are multiple generators each associated with a particular domain and each generating its own data, it may happen that data generated by one generator is incompatible with the domain associated with the other generator, therefore the data should be eliminated. For example, consider a generator that divides the memory into areas, wherein each area may have specific features, such as whether this area is accessible via a cache, can instructions be stored in this area, or the like. If such generator generates such data, while another generator such as an address translation generator generated a case incompatible with these features, the data generated by the address translation generator cannot be selected for the same testing.

In the given example, the floating point domain is independent of the other domains, thus this step may be omitted for the floating point domain. However, in some exemplary embodiments, this domain may also be inter-dependent, such as for example when the floating point number is utilized in an aspect associated with another tested domain.

As for the address translation domain and memory allocation domain, there may exist inter-dependency therebetween. The inconsistency may be exhibited by a number of constrains that should be satisfied simultaneously by the generator for test data related to address translation, as well as by the generator for test data related to memory allocation. In order to resolve this dependency, one of said generators may be executed, and its output may then be passed to the other generator. If the other generator can generate a valid solution for the test data, then the test data does not exhibit inconsistency and should not be removed. If no valid solution can be generated by the other generator, the test data is inconsistent and is therefore removed.

Selection steps 108 may further comprise substep 128 for selecting for each possible request by the exerciser a number of test data items, so that the test data together with the exerciser can fit within the memory available at testing time. It will be appreciated that the data can be selected randomly, in a particular order, in accordance with some criteria or priority such as preferring tests that are known to be of high quality, manually, or in a combination of two or more of the above. For example, some tests known to be of high quality are always given priority and are always selected if the space limitations allow, while if more tests are required, they may be randomly selected from the rest of the available tests.

As for the floating point domain, the data is indicated as related to floating point and can thus be extracted from the pre-generated data set.

As for the address translation domain, two types of biases are recognized: single instruction biases and multiple instruction biases. The data for single instruction biases can be extracted from the pre-generated data set, since the biases used for the generation are reflected in the indexing. The data for the multiple instruction biases supported by the generation tool are limited to the same attribute used in multiple translations. In order to produce data for this type of biases, data items with the same value of the desired attribute are collected. As for every data item, this value is available in the pre-generated data set, and data items can therefore be selected in accordance with this value.

As for memory allocation between threads domain, the same two types of biases exist, single instruction biases and multiple instruction biases. Similarly to the address translation domain, the data for the single instruction biases can be extracted from the pre-generated data set, since the biases used for the generation are recorded. The data for the multiple instruction biases supported by the generation tool are limited to the same attribute used in multiple memory ranges, wherein the same attribute usually relates to the cache line. In order to produce data for this type of biases, data items with the same value of the desired attribute are collected. As for every data item, this value is available in the pre-generated data set, and data items can therefore be selected in accordance with this value.

It will be appreciated by a person skilled in the art that the disclosed biases are exemplary only, while the steps are applicable to any biases.

Referring now to FIG. 1B, showing a flowchart diagram of steps in a method for post-silicon device testing, wherein the tested device comprises a memory unit. It will be appreciated that the method of FIG. 1A described above may be performed by a different computerized device than the device being tested (i.e., a post-silicon computation platform).

On step 130, the exerciser program is loaded or mounted to the memory unit of the tested device, so that the exerciser program may cause the tested device to generate and execute test cases that use the test data. Also mounted to the memory device is the test data subset selected on step 108 and indexed on step 112, since the subset has been selected to be small enough to fit within the memory unit together with the exerciser.

The following steps relate to the exerciser performing actions. In some embodiments, the exerciser causes the tested device to perform these steps.

On step 132 the exerciser may generate a test case, in accordance with one or more domains being tested, for example floating point, address translation, or memory allocation domains.

On step 136, the exerciser may retrieve test data relevant for the generated test case. The data is retrieved from the data generated on step 100, selected on step 108 and indexed on step 112 and loaded to the memory unit. Thus, the exerciser constructs in a relatively fast and efficient manner a test case with relevant test data, wherein the test data which may have taken a long time to produce was generated off line, using relatively complex computations. The retrieval may be relatively efficient due to the indexing performed on step 112.

On step 140, the exerciser executes the test case with the test data.

On step 144 the exerciser may perform an evaluation action for evaluating the device in accordance with the test case. Testing the device may relate to a variety of effects.

In some embodiments, evaluating may relate to comparing a result received from the device with a predetermined result, such as a result received together with the test data. In other embodiments, the test case may be run by two different parts of the device or by or two different algorithms, and the two or more results may be compared, wherein equal result may indicate proper operation. In yet other embodiments, the performance of the device as related to time and resource utilization may be evaluated, and in yet further embodiments the device may be tested for completing the testing without experiencing failures or exceptions, regardless of the returned results. It will be appreciated that the abovementioned validation methods are exemplary only, and further validation methods may be utilized instead thereof or in addition to them.

Figure 2:
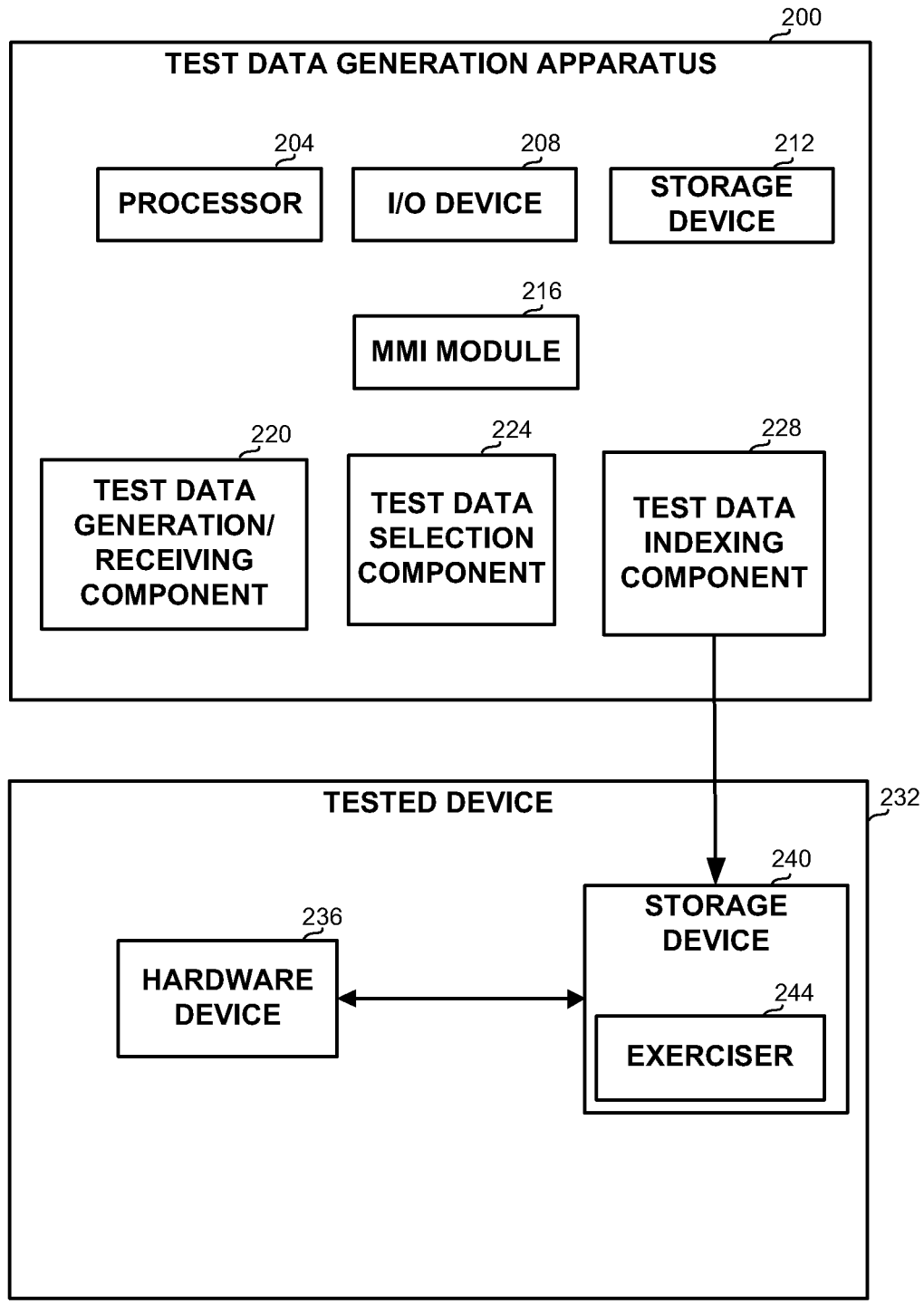
FIG. 2 shows a block diagram of components of an apparatus for post-silicon device testing, in accordance with some exemplary embodiments of the disclosed subject matter.

Referring now to FIG. 2, showing a block diagram of components of an apparatus for post-silicon device testing.

The environment comprises test data generation apparatus 200, which is operative offline in generating an indexed collection of test data, for example using the method shown in FIG. 1A, and tested device 232 which is tested using the indexed collection of test data.

In some exemplary embodiments, apparatus 200 may comprise a processor 204. Processor 204 may be a Central Processing Unit (CPU), a microprocessor, an electronic circuit, an Integrated Circuit (IC) or the like. Alternatively, apparatus 200 can be implemented as firmware written for or ported to a specific processor such as digital signal processor (DSP) or microcontrollers, or can be implemented as hardware or configurable hardware such as field programmable gate array (FPGA) or application specific integrated circuit (ASIC).

Processor 204 may be utilized to perform computations required by apparatus 200 or any of it subcomponents.

In some exemplary embodiments of the disclosed subject matter, apparatus 200 may comprise an Input/Output (I/O) device 208 such as a terminal, a display, a keyboard, an input device or the like to interact with the system, to invoke the system and to receive results. It will however be appreciated that the system can operate without human operation.

In some exemplary embodiments, apparatus 200 may comprise one or more storage devices such as storage device 212. Storage device 212 may be persistent or volatile. For example, storage device 212 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, storage device 212 may retain program code operative to cause processor 204 to perform acts associated with any of the steps shown in FIG. 1A above, for example generating the test data, selecting subsets of the test data, indexing the test data, or the like.

A user (not shown) may utilize a man-machine interface (MMI) module 216. MMI module 216 may be utilized to receive input or provide output to and from the apparatus, for example receiving specific user commands or parameters related to the apparatus, storing and retrieving information to and from a database, providing output, or the like.

The components detailed below may be implemented as one or more sets of interrelated computer instructions, executed for example by processor 204 or by another processor. The components may be arranged as one or more executable files, dynamic libraries, static libraries, methods, functions, services, or the like, programmed in any programming language and under any computing environment.

Apparatus 200 may comprise a test data generation or receiving component 220, for generating or receiving test data related to one or more domains.

Apparatus 200 may further comprise test data selection component 224 for selecting a subset of the test data relevant for a particular device being tested. Additionally or alternatively, the subset may be selected based on one or more domains which are to be tested with respect to the device. The selection may be performed as described in association with steps 108 of FIG. 2A above.

Apparatus 200 may also comprise test data indexing component 228 for indexing the subset of the test data selected by selection component 224.

A tested device 232 which undergoes testing, generally comprises a hardware device 236 such as processor, upon the description of which, the test data is selected by selection component 224. Hardware device 236 may be a post-silicon computation platform.

Tested device 232 may also comprise storage device 240 which may be implemented as part of hardware device 236 or separately. Storage device 240 stores the selected and indexed test data, and may be persistent, volatile such as a memory unit, or a combination thereof. In operation, exerciser 244, which comprises one or more interrelated sets of computer instructions, is also loaded into storage device 240 and is operative in causing hardware device 236 to generate tests, populate the tests with test data, and execute the tests.

Exerciser 244 may comprise a test generator (not shown) for generating a test case, a test populating unit (not shown) for retrieving test data from storage device 240 and populating the test case with the test data; and an execution component (not shown) for executing the test case.

Once exerciser 244 has caused hardware device 236 to generate a test, hardware device 236 may retrieve test data from storage device 240, and populate the generated test using with the selected and indexed test data. The generated test may be stored within the storage device 240. Hardware device 236 may then execute the test, such as for example by modifying an instruction pointer to point to the address comprising the first instruction of the test within the storage device 240.

Exerciser unit 244 may also comprise an evaluator component (not shown) for causing hardware device 236 or another processor to evaluate the performance of hardware device 236 over the executed test cases, by receiving test results and comparing them to predetermined results, comparing results obtained from two algorithms or two areas of hardware device 236, evaluating resource consumption, evaluating execution properness, or the like.

The disclosed methods and apparatus enable the testing of devices by combining offline generation of a large number of test data items, including test data which is complex to generate, with efficient online usage of the test data. The combination provides for thorough testing, as well as high utilization of the time window available for testing the device.

The flowchart and block diagrams in the figures illustrate the architecture, functionality, and operation of possible implementations of systems, methods and computer program products according to various embodiments of the present disclosure. In this regard, each block in the flowchart and some of the blocks in the block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, any non-transitory computer-readable medium, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method performed by a computerized device, comprising:
    generating a collection of test data for testing at least one domain, wherein the test data is useful for post-silicon verification of hardware devices;
    selecting a subset of the collection of test data in accordance with a hardware device to be tested and the at least one domain to be tested with respect to the hardware device; and
    indexing the subset of the collection of test data to obtain an indexed collection, wherein the indexed collection is separate from an exerciser program that is configured to be executed by the hardware device, wherein the exerciser program is configured to generate a test case and execute the test case, wherein the exerciser program is further configured to access the indexed collection in order to perform the generation of the test case.

2. The computer-implemented method of claim 1 further comprising validating correctness of execution of the test case by the hardware device.

3. The computer-implemented method of claim 2 wherein said validating relates to an action selected from the group consisting of: receiving a result for the test case and comparing the result with a predetermined result; receiving two results for the test case and comparing the two results; profiling performance of the hardware device; and verifying that the hardware device completes the test case.

4. The computer-implemented method of claim 1 further comprising:
    mounting the exerciser program to a storage device associated with the hardware device; and
    mounting the indexed collection to the storage device.

5. The computer-implemented method of claim 4 wherein said selecting the subset is performed so that the subset is sufficiently small to be retained in the storage device along with the exerciser program.

6. The computer-implemented method of claim 1 wherein said selecting comprises:
    receiving at least one description of a request for test data;
    eliminating from the collection test data for non-functional design areas;
    filtering out from the collection test data irrelevant for the hardware device; and
    selecting at least one item from the collection for each of the at least one description.

7. The computer-implemented method of claim 6 further comprising filtering out from the collection test data that is inconsistent with the domain to be tested.

8. The computer-implemented method of claim 1 wherein the hardware device is a post-silicon device selected from the group consisting of a prototype, a wafer and a fabricated circuit.

9. The computer-implemented method of claim 1 wherein at least one of said generating, selecting, and indexing is performed by a computerized platform other than the hardware device.

10. An apparatus having a processing unit and a storage device, the apparatus comprising:
    a collection of test data for testing at least one domain associated with a hardware device to be tested, wherein the test data is useful for post-silicon verification of the hardware device, and wherein the collection stored on the storage device;

a test data selection component for selecting a subset of the collection of test data in accordance with the hardware device to be tested and the at least one domain to be tested; and a test data indexing component for indexing the subset of the collection of test data to obtain an indexed collection, wherein the indexed collection is separate from an exerciser program that is configured to be executed by the hardware device, wherein the exerciser program is configured to generate a test case and execute the test case, wherein the exerciser program is further configured to access the indexed collection in order to perform the generation of the test case.

11. The apparatus of claim 10 further comprising the exerciser program being loaded onto a storage device associated with the hardware device, the exerciser program comprising:

a test generator for causing the hardware device to generate a test case;

a test populating unit for causing the hardware device to retrieve from the indexed collection test data to be used with the test case; and an execution component for causing the hardware device to execute the test case.

12. The apparatus of claim 11 wherein the exerciser program further comprises an evaluator unit for performing an evaluation action, the evaluation action selected from the group consisting of: receiving a result for the test case and comparing the result with a predetermined result; receiving two results for the test case and comparing the two results; profiling performance of the hardware device; and verifying that the hardware device completes the test case.

13. The apparatus of claim 11 wherein the exerciser program and the indexed collection are retained within the storage device associated with the hardware device.

14. The apparatus of claim 11 wherein the test data selection component is adapted to select the subset so that the subset is sufficiently small to be retained in the storage device along with the exerciser program.

15. The apparatus of claim 10 wherein the test data selection component is adapted to:

receive at least one description of a request for test data;

eliminate from the collection test data for unsupported design areas;

eliminate from the collection test data irrelevant for the hardware device; and select at least one item from the collection for each of the at least one description.

16. The apparatus of claim 10 wherein the test data selection component is further adapted to eliminate from the collection test data that is inconsistent with the domain to be tested.

17. The apparatus of claim 10 wherein the hardware device is a post-silicon device selected from the group consisting of a prototype, a wafer and a fabricated circuit.

18. A computer program product comprising:

a non-transitory computer readable medium;

a first program instruction for generating a collection of test data for testing at least one domain, wherein the test data is useful for post-silicon verification of hardware devices;

a second program instruction for selecting a subset of the collection of test data in accordance with a hardware device to be tested and at least one domain to be tested with respect to the hardware device;

a third program instruction indexing the subset of the collection of test data to obtain an indexed collection, wherein the indexed collection is separate from an exerciser program that is configured to be executed by the hardware device, wherein the exerciser program is configured to generate a test case and execute the test case, wherein the exerciser program is further configured to access the indexed collection in order to perform the generation of the test case; and wherein said first, second and third program instructions are stored on said non-transitory computer readable medium.

* * * * *